United States Patent
Kobayashi et al.

(10) Patent No.: US 10,953,587 B2
(45) Date of Patent: Mar. 23, 2021

(54) TUBE AND METHOD FOR MANUFACTURING SAME

(71) Applicant: Gunze Limited, Ayabe (JP)

(72) Inventors: Daiki Kobayashi, Konan (JP); Hiroshi Oshima, Konan (JP); Kazutaka Sekiya, Konan (JP)

(73) Assignee: GUNZE LIMITED, Ayabe (JP)

( * ) Notice: Subject to any disclaimer, the term of this patent is extended or adjusted under 35 U.S.C. 154(b) by 155 days.

(21) Appl. No.: 16/352,233

(22) Filed: Mar. 13, 2019

(65) Prior Publication Data

US 2019/0299512 A1 Oct. 3, 2019

(30) Foreign Application Priority Data

Mar. 30, 2018 (JP) .............................. JP2018-067430

(51) Int. Cl.
*B29C 48/30* (2019.01)
*F16L 11/12* (2006.01)
(Continued)

(52) U.S. Cl.
CPC ........... *B29C 48/30* (2019.02); *A61J 15/0003* (2013.01); *B29C 48/09* (2019.02); *F16L 11/06* (2013.01);
(Continued)

(58) Field of Classification Search
CPC ...... B29C 48/30; B29C 48/09; A61J 15/0003; F16L 11/06; F16L 11/02; F16L 11/04;
(Continued)

(56) References Cited

U.S. PATENT DOCUMENTS

| 2003/0215582 A1 | 11/2003 | Bermel |
| 2015/0010761 A1 | 1/2015 | Tasaka et al. |
| 2018/0281262 A1 | 10/2018 | Kikuchi et al. |

FOREIGN PATENT DOCUMENTS

| EP | 1367083 A2 | 3/2003 |
| EP | 2832821 A1 | 2/2015 |

(Continued)

OTHER PUBLICATIONS

European Search Report for application No. EP 19164849.2, dated Jul. 23, 2019.

*Primary Examiner* — Ellen S Hock
(74) *Attorney, Agent, or Firm* — Knobbe, Martens, Olson & Bear, LLP

(57) ABSTRACT

Provided are a tube that has high inner-surface smoothness and outer-surface smoothness and a thickness distribution with a small variation, and a method for manufacturing the tube. The tube includes points a, b, c, and d that satisfy the following conditions (1) and (2): (1) $0.9<\text{Rea}/\text{Rec}<1.1$ and $0.9<\text{Reb}/\text{Red}<1.1$; and (2) $\text{Rea}/\text{Reb} \leq 0.9$ or $\text{Rea}/\text{Reb} \geq 1.1$. The points a, b, c, and d are four random points that are located on the circumference of the tube on any cross section in the axial direction of the tube, and are aligned in the stated order in a circumferential direction. Rea, Reb, Rec, and Red respectively indicate retardations at the points a, b, c, and d. The tube satisfies the following condition (3): (3) (10-point standard deviation/10-point average)$\times 100 \leq 2$ in the respective sets A, B, C, and D. Each of the sets A, B, C, and D includes retardations at ten random points present in a range between the point a, b, c, or d and a point 5 mm away from that point in the axial direction.

7 Claims, 12 Drawing Sheets

(51) Int. Cl.
  *A61J 15/00* (2006.01)
  *B29C 48/09* (2019.01)
  *F16L 11/06* (2006.01)
  *B29K 27/12* (2006.01)
  *B29K 105/02* (2006.01)
  *F16L 11/04* (2006.01)

(52) U.S. Cl.
  CPC ............ *F16L 11/12* (2013.01); *B29K 2027/12* (2013.01); *B29K 2105/02* (2013.01); *B29K 2995/0081* (2013.01); *F16L 11/04* (2013.01)

(58) Field of Classification Search
  CPC ........ B29K 2027/12; B29K 2995/0081; B29K 2105/02
  See application file for complete search history.

(56) References Cited

FOREIGN PATENT DOCUMENTS

| | | |
|---|---|---|
| JP | 2017-044335 A | 3/2017 |
| WO | WO 2017/043317 A1 | 3/2017 |

TUBE AND METHOD FOR MANUFACTURING SAME

TECHNICAL FIELD

The present invention relates to a tube and a method for manufacturing the tube.

BACKGROUND ART

WO 2017/043317 (Patent Literature 1) discloses a fluororesin tube having tearability. Longitudinal tearability is imparted to this tube by forming a weld line in the tube. This tube is used to manufacture a catheter and the like, and therefore, high inner-surface smoothness is realized in this tube (see Patent Literature 1).

WO 2017/043317 is an example of related art.

SUMMARY OF THE INVENTION

In general, a tube in which a weld line is formed has a reduced surface smoothness. Regarding the tube disclosed in the above-mentioned Patent Literature 1, high inner-surface smoothness is realized while a weld line is formed.

However, there is a high likelihood that the outer-surface smoothness will be reduced due to a weld line being formed. For example, there is a high likelihood that minute scratches will be formed on the outer surface of the tube or the tube will tear during a diameter increasing step in which heat-shrinkable properties are imparted to the tube. Also, it is likely that the thickness distribution will vary widely in the tube due to the weld line being formed. Due to the thickness distribution with a wide variation, the thermal conductivity will be uneven in the tube, and thus the tube will shrink unevenly, for example.

The present invention was made in order to solve such a problem, and it is an object thereof to provide a fluororesin tube that has tearability, high inner-surface smoothness and outer-surface smoothness, and a thickness distribution with a small variation, and a method for manufacturing the tube.

A tube according to an aspect of the present invention is a tube made of a fluororesin. This tube has axial tearability and heat-shrinkable properties. The tube includes points a, b, c, and d that satisfy both conditions (1) and (2) below.

$$0.9 < Rea/Rec < 1.1 \text{ and } 0.9 < Reb/Red < 1.1 \quad (1)$$

$$Rea/Reb \leq 0.9 \text{ or } Rea/Reb \geq 1.1 \quad (2)$$

The points a, b, c, and d are four random points that are located on the circumference of the tube on any cross section in the axial direction of the tube, and are aligned in the stated order in a circumferential direction. Rea, Reb, Rec, and Red respectively indicate retardations at the points a, b, c, and d. The tube satisfies a condition (3) below.

$$\text{(10-point standard deviation/10-point average)} \times 100 \leq 2 \text{ in respective sets } A, B, C, \text{ and } D \quad (3)$$

Each of the sets A, B, C, and D includes retardations at ten random points present in a range between the point a, b, c, or d and a point 5 mm away from that point in the axial direction.

The inventors of the present invention found that a tube that satisfies the above-mentioned conditions (1), (2), and (3) has tearability, high inner-surface smoothness and outer-surface smoothness, and a thickness distribution with a small variation. The above-described tube satisfies the above-mentioned conditions (1), (2), and (3). Therefore, with this tube, tearability, high inner-surface smoothness and outer-surface smoothness, and a thickness distribution with a small variation can be realized.

It is preferable that the surface roughness Rz of the outer surface of the tube is 2.0 μm or less.

It is preferable that the surface roughness Ra of the outer surface of the tube is 1.0 μm or less.

It is preferable that, in the above-mentioned tube, a distance between the points a and b is shorter than a quarter of the circumferential length of the tube.

In this tube, the points a and b between which the difference in retardation is large are arranged near each other. Therefore, with this tube, high tearability can be realized.

It is preferable that a distance between the points a and b is 0.4 mm or shorter.

It is preferable that, in the above-mentioned tube, the fluororesin can be molded through heat-melting extrusion molding.

With the heat-melting extrusion molding, differences in retardation are likely to occur in a tube. With the above-described tube, the fluororesin can be molded through heat-melting extrusion molding. Therefore, with this tube, differences in retardation occur, thus making it possible to realize high tearability.

It is preferable that, in the above-mentioned tube, the fluororesin is a multi-component copolymer constituted by three or more types of monomers.

With this tube, the fluororesin is a multi-component copolymer constituted by three or more types of monomers and has low crystallizability, and high transparency is thus realized. Therefore, with this tube, a user can visually confirm a subject covered with the tube from the outside. In addition, since the fluororesin is a multi-component polymer constituted by three or more types of monomers, the fluororesin can be molded at a lower temperature compared with a case where the fluororesin is a binary copolymer. On the other hand, fluororesin decomposition temperatures are the same. Therefore, with this tube, a range of the selection of temperatures at which the fluororesin is molded and a diameter increasing process for imparting heat-shrinkable properties to the tube is performed can be increased compared with a case where the fluororesin is a binary copolymer, for example.

A manufacturing method according to another aspect of the present invention is a method for manufacturing a tube made of a fluororesin. The tube has axial tearability and heat-shrinkable properties. Four random points that are located on the circumference of the tube on any cross section in the axial direction are respectively referred to as points a, b, c, and d, which are aligned in the stated order in a circumferential direction. Retardations at the points a, b, c, and d are respectively referred to as Rea, Reb, Rec, and Red. Sets that each include retardations at ten random points present in a range between the point a, b, c, or d and a point 5 mm away from that point in the axial direction are respectively referred to as sets A, B, C, and D. The manufacturing method includes: a step of measuring retardations at a plurality of positions of the tube manufactured using a manufacturing apparatus; and a step of adjusting the manufacturing apparatus based on the measured retardations such that a tube to be manufactured satisfies conditions (1), (2), and (3) below.

$$0.9 < Rea/Rec < 1.1 \text{ and } 0.9 < Reb/Red < 1.1 \quad (1)$$

$$Rea/Reb \leq 0.9 \text{ or } Rea/Reb \geq 1.1 \quad (2)$$

$$\text{(10-point standard deviation/10-point average)} \times 100 \leq 2 \text{ in respective sets } A, B, C, \text{ and } D \quad (3)$$

With this manufacturing method, the manufacturing apparatus is adjusted based on feedback about a plurality of retardation measurement results obtained from the tube such that a tube to be manufactured satisfies the above-mentioned conditions (1), (2), and (3). Therefore, with this manufacturing method, even if the fluidity varies depending on the individual resin materials, or the type of resin is changed, for example, appropriate feedback control is performed, thus making it possible to manufacture a tube in which tearability, high inner-surface smoothness and outer-surface smoothness, and a thickness distribution with a small variation are realized. Tearability is evaluated as good tearability, poor tearability, and the like through sensory evaluation, and such an evaluation is not suitable for feedback control. However, with this manufacturing method, the quality of tubes can be numerically managed using optical characteristics such as retardations, thus making it possible to suppress an incidence rate of defects in the manufacturing process.

With the present invention, it is possible to provide a fluororesin tube having tearability, high inner-surface smoothness and outer-surface smoothness, and a thickness distribution with a small variation, and a method for manufacturing the tube.

EMBODIMENTS OF THE INVENTION

Figure 1:
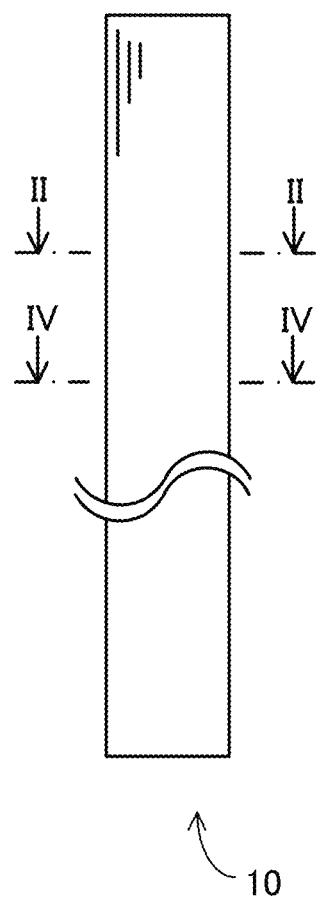
FIG. 1 is a schematic plan view of a tube.

Hereinafter, embodiments of the present invention will be described in detail with reference to the drawings. It should be noted that identical or equivalent portions are denoted by identical reference numerals in the diagrams, and the descriptions thereof are not repeated.

1. Overview

Figure 2:
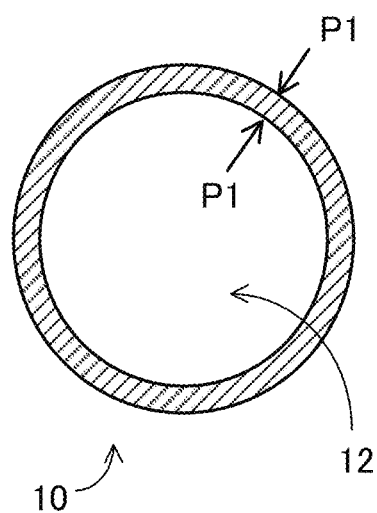
FIG. 2 is a cross-sectional view taken along line II-II in FIG. 1.

FIG. 1 is a schematic plan view of a tube 10 according to this embodiment. FIG. 2 is a cross-sectional view taken along line II-II in FIG. 1. The tube 10 shown in FIGS. 1 and 2 is a heat-shrinkable fluororesin tube inside of which a space 12 is formed.

The tube 10 is used to temporarily cover a catheter during the manufacturing of the catheter, for example. The tube 10 is heated in a state in which a catheter is accommodated in the space 12, for example. The tube 10 thus shrinks, and molten materials of the catheter are crimped by the shrinkage force of the tube, which results in the integration of a plurality of layers such as a metal blade layer and material of a catheter inner layer that constitute the catheter. The tube 10 that temporarily covered the catheter is torn up and removed from the catheter prior to the shipment of the catheter.

A method of forming a plurality of weld lines extending in the axial direction of a tube is known as a method for imparting tearability to a fluororesin tube. However, at least the outer-surface smoothness of the tube in which the weld lines are formed deteriorates compared with a tube in which no weld lines are formed. In addition, the variation of the thickness distribution of the tube may increase due to the weld lines being formed. The increase in the variation of the thickness distribution results in unevenness of the thermal conductivity in the tube, for example. The unevenness of the thermal conductivity results in uneven shrinkage, and thus a force applied to the catheter varies depending on the positions of the tube while the catheter is temporarily covered with the tube, which is not preferable.

With the tube 10 according to this embodiment, axial tearability is realized without forming the weld lines extending in the axial direction. With the tube 10, high tearability, high inner-surface smoothness and outer-surface smoothness, and a thickness distribution with a small variation are realized. Hereinafter, the specific configuration of the tube 10 and a method for manufacturing the tube 10 will be described successively.

2. Configuration of Tube

The tube 10 is made of a thermoplastic fluororesin other than polytetrafluoroethylene. It is preferable that the thermoplastic fluororesin is a thermoplastic resin that can be molded into a tubular shape at a temperature of about 260° C. to 450° C., and preferably at a temperature of about 280° C. to 420° C., for example, through heat-melting extrusion molding.

Examples of the thermoplastic fluororesin include a tetrafluoroethylene-hexafluoropropylene copolymer (FEP), a tetrafluoroethylene-perfluoroalkylvinylether copolymer (PFA), tetrafluoroethylene-ethylene copolymer (ETFE), polychlorotrifluoroethylene (PCTFE), and an ethylene-chlorotrifluoroethylene copolymer (ECTFE).

It is preferable to use a tetrafluoroethylene-hexafluoropropylene copolymer (FEP) or a tetrafluoroethylene-perfluoroalkylvinylether copolymer (PFA) among these resins as the thermoplastic fluororesin from the viewpoint of imparting particularly excellent tearability and high surface smoothness to the tube 10.

It is particularly preferable to use a tetrafluoroethylene-hexafluoropropylene copolymer (FEP) constituted by three or more types of monomers as the thermoplastic fluororesin from the viewpoint of further imparting transparency to the tube 10. Imparting transparency to the tube 10 enables a user to visually confirm the content covered with the tube 10 from the outside. In addition, since the fluororesin is a multi-component polymer constituted by three or more types of monomers, the fluororesin can be molded at a lower temperature compared with a case where the fluororesin is a binary copolymer. On the other hand, fluororesin decomposition temperatures are the same. Therefore, with the tube 10, a range of the selection of temperatures at which the fluororesin is molded and a diameter increasing process for imparting heat-shrinkable properties to the tube 10 is performed can be increased compared with a case where the fluororesin is a binary copolymer, for example.

Figure 3:
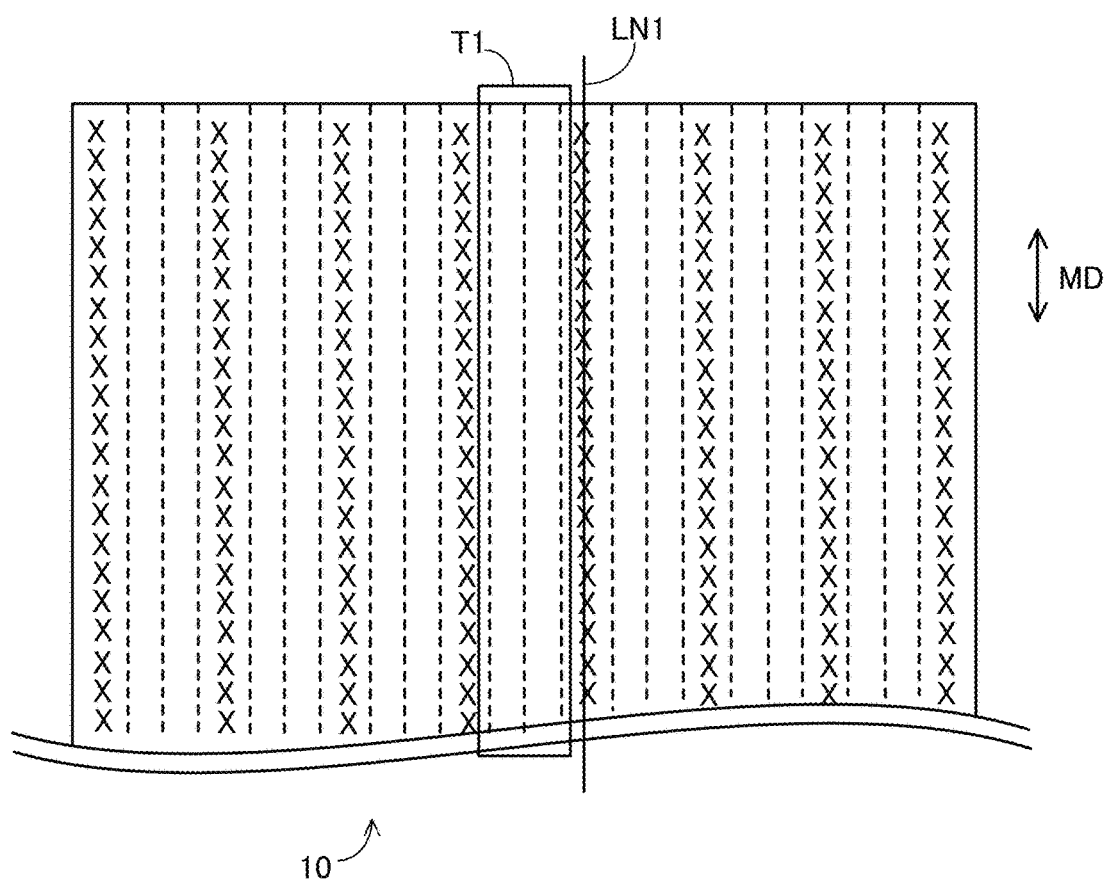
FIG. 3 is a schematic diagram showing the tube cut open at position P1 in FIG. 2.

FIG. 3 is a schematic diagram showing the tube 10 cut open at position P1 in FIG. 2. The points shown in FIG. 3 illustrate images of the orientation of the fluororesin forming the tube 10. In the tube 10, regions T1 in which the fluororesin is oriented uniformly in a machine direction (MD) and lines (also referred to as "optical phase difference lines" hereinafter) LN1 in which the fluororesin is oriented less uniformly in the MD compared with the regions T1 are arranged alternately.

That is, in the tube 10, the optical phase difference lines are formed at predetermined intervals in the circumferential direction. Tearability is imparted to the tube 10 due to these optical phase difference lines being formed. Portions of the outer surface of the tube 10 located at the positions where the optical phase difference lines are formed have higher smoothness (e.g., regarding the surface roughness, $Rz \leq 2.0$ µm and $Ra \leq 1.0$ µm) compared with a case where weld lines are formed in the tube. In addition, the variation of the thickness distribution of the tube 10 in which the optical phase difference lines are formed is smaller compared with the case where the weld lines are formed in the tube.

The inventors of the present invention found that a tube includes a plurality of optical phase difference lines when the tube satisfies predetermined conditions. That is, the tube 10 satisfies the predetermined conditions. Hereinafter, the predetermined conditions will be described.

The tube 10 includes points a, b, c, and d that satisfy both conditions (1) and (2) below. The points a, b, c, and d are four random points that are located on the circumference of the tube 10 on any cross section in the axial direction of the tube 10, and are aligned in the stated order in the circumferential direction.

Figure 4:
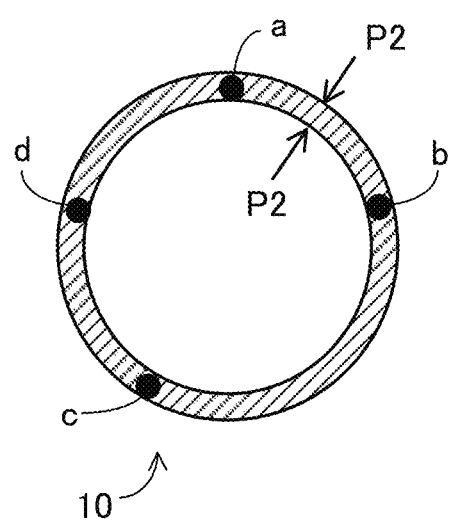
FIG. 4 is a cross-sectional view taken along line IV-IV in FIG. 1, showing examples of four random points on the circumference of the tube.

FIG. 4 is a cross-sectional view taken along line IV-IV in FIG. 1, showing examples of the points a, b, c, and d (four random points on the circumference of the tube 10). As shown in FIG. 4, the points a, b, c, and d are aligned in the order of a, b, c, and d in the circumferential direction on the circumference of the tube 10. Retardations at the points a, b, c, and d are respectively referred to as Rea, Reb, Rec, and Red.

$0.9 < Rea/Rec < 1.1$, and $0.9 < Reb/Red < 1.1$    Condition (1):

$Rea/Reb \leq 0.9$, or $Rea/Reb \geq 1.1$    Condition (2):

The tube 10 further satisfies a condition (3) below. Sets that each include retardations at ten random points present in a range between the point a, b, c, or d and a point 5 mm away from that point in the axial direction are respectively referred to as sets A1, B1, C1, and D1.

Figure 5:
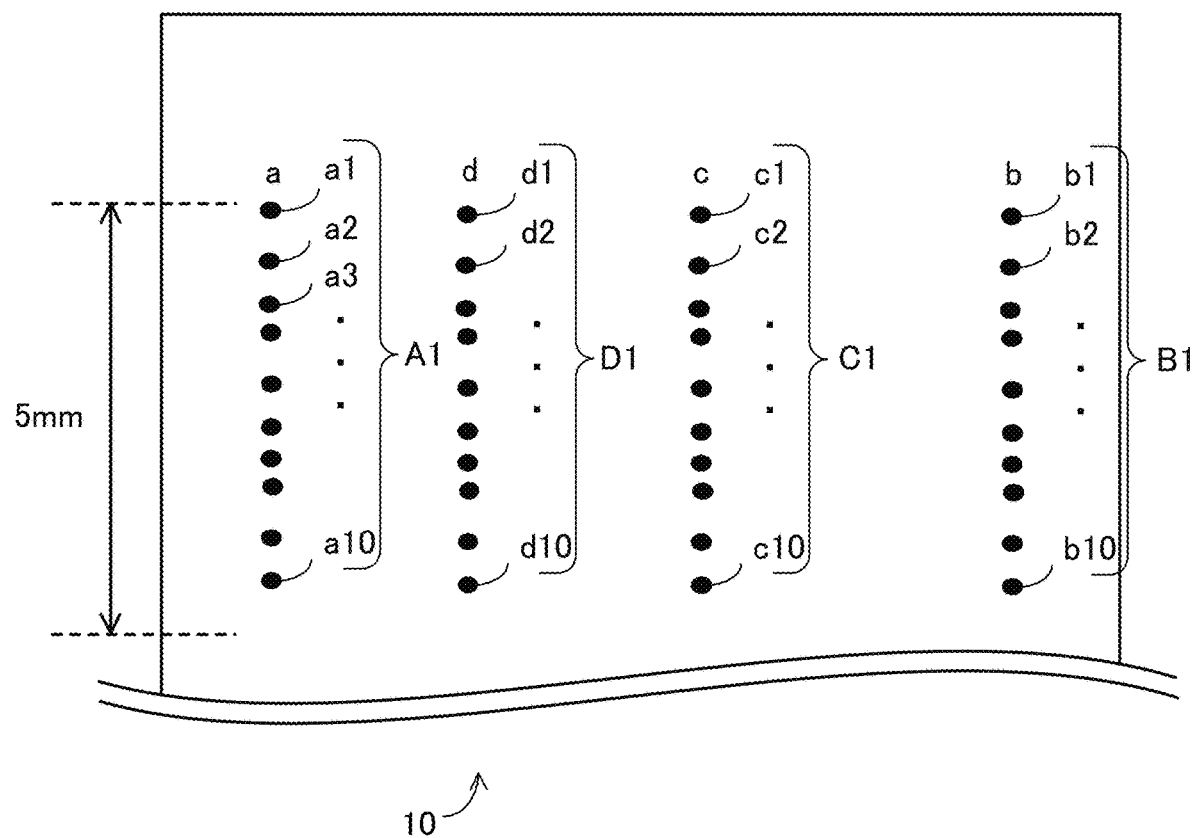
FIG. 5 is a schematic diagram of the tube cut open at position P2 in FIG. 4, showing examples of sets.

FIG. 5 is a schematic diagram of the tube 10 cut open at position P2 in FIG. 4, showing examples of the sets A1, B1, C1, and D1. As shown in FIG. 5, the set A1 includes retardations (Rea1, Rea2, Rea3, . . . , and Rea10) at points a1, a2, a3, . . . , and a10. The set D1 includes retardations (Red1, Red2, . . . , and Red10) at points d1, d2, . . . , and d10. The set C1 includes retardations (Rec1, Rec2, . . . , and Rec10) at points c1, c2, . . . , and c10. The set B1 includes retardations (Reb1, Reb2, . . . , and Reb10) at points b1, b2, . . . , and b10.

(10-point standard deviation/10-point average)×
100≤2 in the respective sets $A, B, C,$ and $D$    Condition (3):

That is, in the tube 10, the difference in retardation between the points a and c and the difference in retardation between the points b and d are small (condition (1)), and the difference in retardation between the points a and b is large (condition (2)). Furthermore, the tendencies shown in the conditions (1) and (2) are maintained in at least portions in the MD (condition (3)).

The inventors of the present invention found that when the above-mentioned conditions (1), (2), and (3) are satisfied, a tube includes a plurality of optical phase difference lines, and tearability is imparted to the tube due to the plurality of optical phase difference lines. Furthermore, in addition to the above-mentioned conditions (1), (2), and (3), the inventors of the present invention found a method for increasing the surface smoothness of a tube (e.g., regarding the surface roughness, $Rz \leq 2.0$ µm and $Ra \leq 1.0$ µm) and reducing the variation of the thickness distribution of the tube (compared with a case where weld lines are formed) even in the case where a plurality of optical phase difference lines are formed. The tube 10 according to this embodiment satisfies all of these conditions. Therefore, with the tube 10, tearability, high inner-surface smoothness and outer-surface smoothness, and a thickness distribution with a small variation can be realized.

It should be noted that, in this embodiment, the distance between the points a and b is shorter than a quarter of the circumferential length (an intermediate length between the outer circumferential length and the inner circumferential length) of the tube 10 (e.g., 0.4 mm or shorter), for example. When a spider 24 (which will be described later (FIG. 7)) has eight leg portions 27, it is preferable that the distance between the points a and b is shorter than an eighth of the circumferential length of the tube 10, for example. It is more preferable that the distance between the points a and b is shorter than a sixteenth of the circumferential length of the tube 10, for example. Since two points (points a and b) between which the difference in retardation is large are arranged near each other, high tearability is realized in the tube 10.

3. Method for Manufacturing Tube

Before a method for manufacturing the tube 10 is described, a manufacturing apparatus 20 for manufacturing the tube 10 will be described first.

Figure 6:
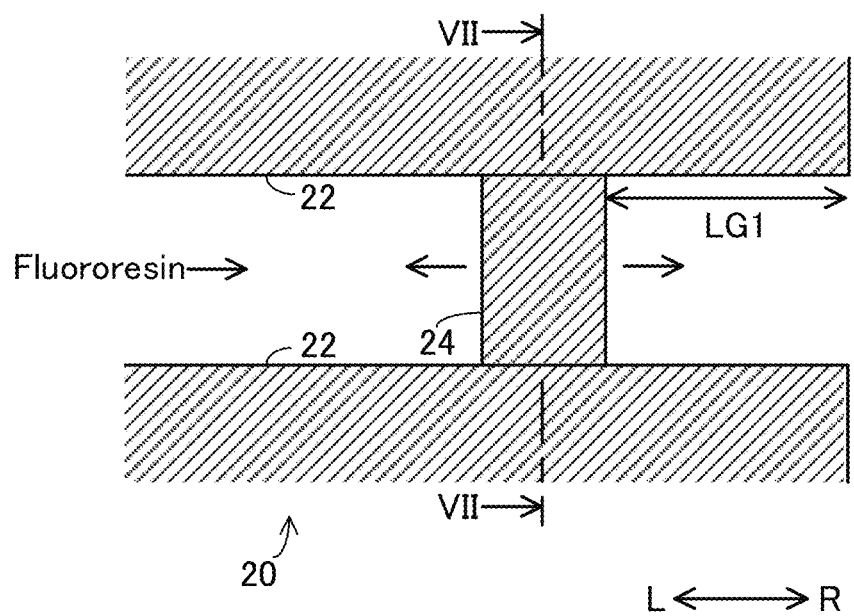
FIG. 6 is a schematic lateral cross-sectional view of a manufacturing apparatus.

FIG. 6 is a schematic lateral cross-sectional view of the manufacturing apparatus 20. As shown in FIG. 6, the manufacturing apparatus 20 is an extrusion molding machine, and a single-screw extruder is used, for example. The manufacturing apparatus 20 includes a cylinder 22 with a circular cross section and a spider 24 arranged inside the cylinder 22, for example.

During operation of the manufacturing apparatus 20, the inside of the cylinder 22 is heated, and the molten state of a material flowing inside the cylinder 22 is thus maintained. The spider 24 serves as a mold, and can be moved in directions illustrated by arrows L and R inside the cylinder 22. A thermoplastic fluororesin used as a material of the tube 10 is extruded from the upstream side (arrow L side) of the cylinder 22 toward the downstream side (arrow R side) in a molten state.

Figure 7:
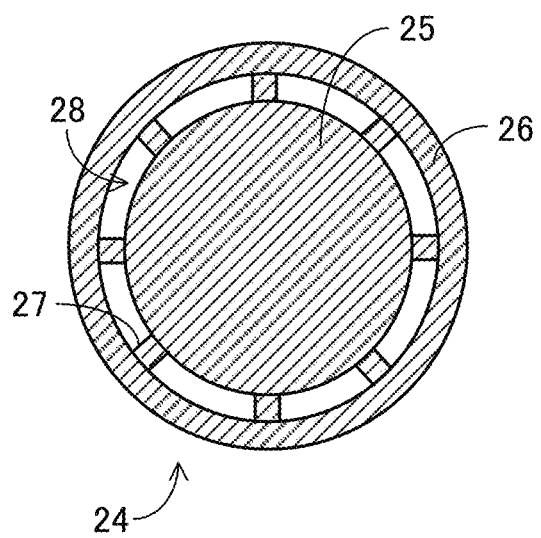
FIG. 7 is a cross-sectional view of a spider taken along line VII-VII in FIG. 6.

FIG. 7 is a cross-sectional view of the spider 24 taken along line VII-VII in FIG. 6. As shown in FIG. 7, the spider 24 includes an inner base 25, an outer base 26, and a plurality of (eight in this example) leg portions 27 provided between the inner base 25 and the outer base 26. The leg portions 27 radially extend from the inner base 25 to the outer base 26. The fluororesin flowing inside the cylinder 22 temporarily diverges due to the leg portions 27, and flows together again after passing through channels 28.

Accordingly, the weld lines are temporarily formed in the tube 10. Due to the length LG1 (FIG. 6) of a portion on the downstream side with respect to the spider 24 being sufficiently long, the weld lines are eliminated and only the optical phase difference lines remain (the optical phase difference lines are formed at positions corresponding to the leg portions 27) when the tube 10 comes out of the cylinder 22. That is, due to the fluororesin flowing along the sufficient length LG1, the surface smoothness of the tube 10 increases, and the variation of the thickness distribution of the tube 10 decreases. In addition, the state in which the fluororesin is less uniformly oriented is maintained. Accordingly, the tube 10 having tearability, high surface smoothness, and a thickness distribution with a small variation is realized.

However, if the length LG1 is too long, not only the weld lines but also the optical phase difference lines will be eliminated in the tube 10. Therefore, in this embodiment, the manufacturing method is devised such that only the optical phase difference lines remain in the tube 10. That is, in this embodiment, the position of the spider 24 is adjusted such that only the optical phase difference lines remain in the tube 10.

Figure 8:
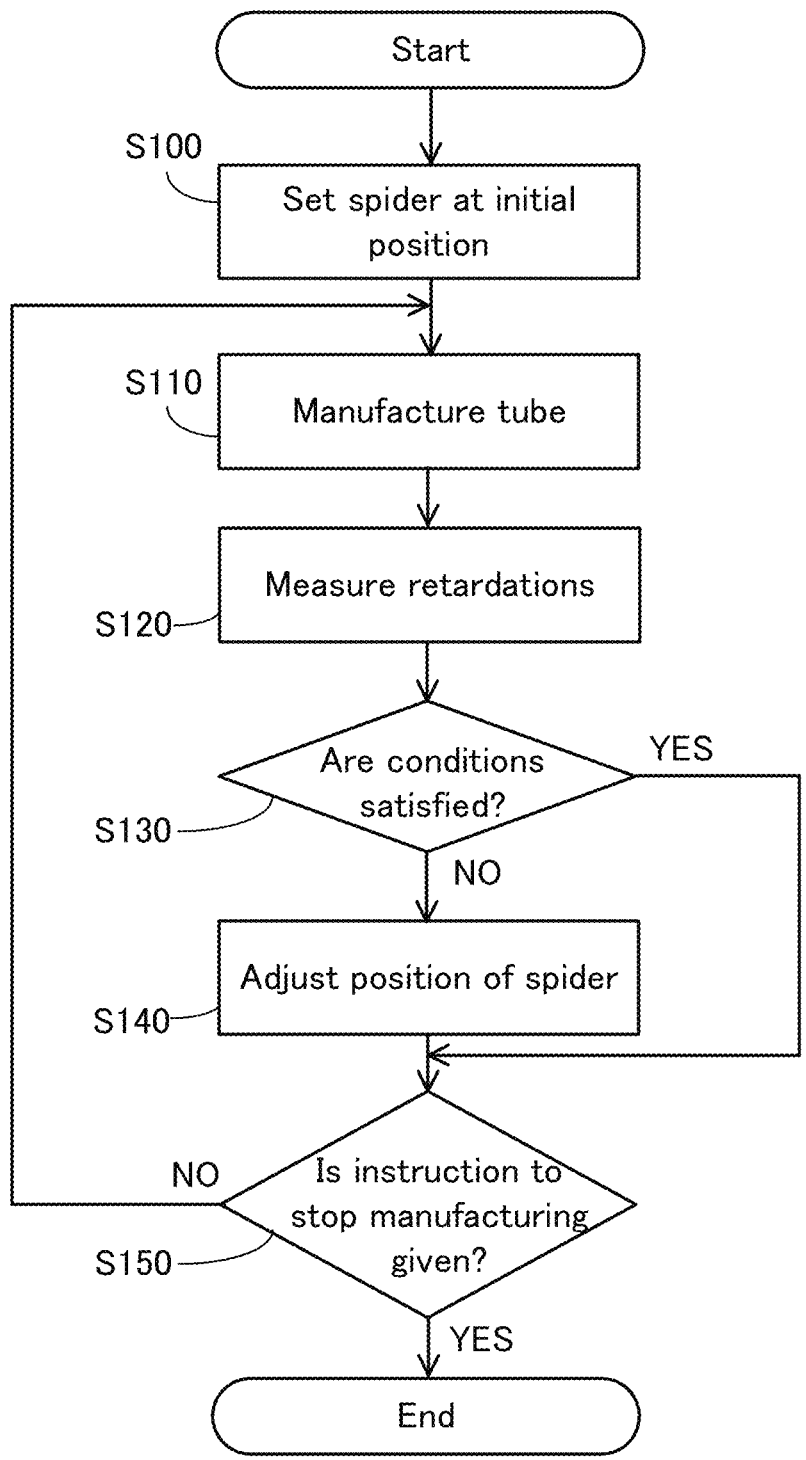
FIG. 8 is a flowchart showing a procedure of manufacturing the tube.

FIG. 8 is a flowchart showing a procedure of manufacturing the tube 10 (a procedure of adjusting the position of the spider 24). As shown in FIG. 8, an operator sets the spider 24 at an initial position inside the cylinder 22 (step S100). The operator manufactures a tube in the state in which the spider 24 is set at the initial position (step S110).

The operator measures the retardation distribution of the manufactured tube (step S120). The operator determines if predetermined conditions (including the above-mentioned conditions (1), (2), and (3)) are satisfied, based on the measured retardation distribution (step S130).

When it is determined that the predetermined conditions are satisfied (YES in step S130), the operator determines whether or not an instruction to stop the manufacturing of the tube 10 has been given (step S150), and continues to manufacture the tube 10 without changing the position of the spider 24 until the instruction to stop the manufacturing is given.

On the other hand, when it is determined that the predetermined conditions are not satisfied (NO in step S130), the operator adjusts the position of the spider 24 (step S140). When it is determined that the optical phase difference lines have been eliminated, for example, the operator adjusts the position of the spider 24 so as to reduce the length LG1. On the other hand, when it is determined that the weld lines remain (for example, when the tube 10 has a low surface smoothness (e.g., regarding the surface roughness, $Rz \leq 2.0$ μm and $Ra \leq 1.0$ μm)), the operator adjusts the position of the spider 24 so as to increase the length LG1.

Thereafter, the operator determines whether or not an instruction to stop the manufacturing of the tube 10 has been given (step S150). When it is determined that the instruction to stop the manufacturing has been given (YES in step S150), the operator operates the manufacturing apparatus 20 so as to stop the manufacturing of the tube 10. On the other hand, when it is determined that the instruction to stop the manufacturing has not been given (NO in step S150), the operator continues to manufacture the tube 10 (steps S110 to S140).

As described above, in the manufacturing method according to this embodiment, the position of the spider 24 is adjusted based on the feedback about the retardation measurement results obtained from the manufactured tube, such that a tube to be manufactured satisfies the predetermined conditions. Therefore, with this manufacturing method, even if the fluidity varies depending on the individual resin materials, or the type of resin is changed, for example, appropriate feedback control is performed, thus making it possible to manufacture the tube 10 in which tearability, high inner-surface smoothness and outer-surface smoothness, and thickness distribution with a small variation are realized. In addition, with this manufacturing method, the quality of tubes can be numerically managed using optical characteristics such as retardation, thus making it possible to suppress an incidence rate of defects in the manufacturing process.

4. Features

As described above, the tube 10 according to this embodiment satisfies the predetermined conditions (including the above-mentioned conditions (1), (2), and (3)). Therefore, with the tube 10, tearability, high inner-surface smoothness and outer-surface smoothness, and a thickness distribution with a small variation can be realized.

In the method for manufacturing a tube 10 according to this embodiment, the position of the spider 24 is adjusted based on the feedback about the retardation measurement results obtained from the manufactured tube such that a tube 10 to be manufactured satisfies the predetermined conditions (including the above-mentioned conditions (1), (2), and (3)) Therefore, with this manufacturing method, even if the fluidity varies depending on the individual fluororesins, or the type of resin is changed, for example, appropriate feedback control is performed, thus making it possible to manufacture the tube 10 in which tearability, high inner-surface smoothness and outer-surface smoothness, and a thickness distribution with a small variation are realized. In addition, with this manufacturing method, the quality of tubes can be numerically managed using optical characteristics such as retardation, thus making it possible to suppress an incidence rate of defects in the manufacturing process.

5. Modified Examples

Although the embodiment of the present invention has been described above, the present invention is not limited to the above embodiment, and various modifications can be carried out without departing from the gist of the invention. Hereinafter, modified examples will be described. It should be noted that modified examples below can be implemented in combination as appropriate.

5-1

In the above embodiment, the optical phase difference lines are formed in the tube 10 by adjusting the position of the spider 24 inside the cylinder 22 (i.e., by adjusting the length LG1 (FIG. 6)). However, a subject to be adjusted is not limited to the length LG1. The optical phase difference lines may be formed in the tube 10 by adjusting the heating temperature of the spider 24, for example.

Moreover, the optical phase difference lines may be formed in the tube 10 by adjusting the flow rate of the fluororesin material inside the cylinder 22, for example.

5-2

In the above embodiment, an operator performs various kinds of operations and determinations during the manufacturing process. However, these operations and determinations are not necessarily performed by humans. For example, these operations and determinations may be automatically carried out by an apparatus including a computer.

6. Working Examples

Hereinafter, Working Examples 1, 2, and 3 and a comparative example will be described. A tetrafluoroethylene-hexafluoropropylene copolymer (FEP; FEP-130J manufactured by Mitsui DuPont Fluorochemicals Co., Ltd.) was used as the fluororesin in Working Examples 1, 2, and 3. Regarding Working Examples 1, 2, and 3, the manufacturing method described in the above embodiment was used to manufacture fluororesin tubes.

Regarding the fluororesin tube of Working Example 1, the inner diameter was 3.5 mm, Rea/Rec and Reb/Red were 0.968 to 1.070, Rea/Reb was 0.887, and 10-point standard deviation/10-point average was 0.353 to 0.701. Furthermore, regarding the outer-surface roughness, Rz was 0.7, and Ra was 0.27.

It should be noted that KOBRA-CCD/X20P, which was used as a measurement apparatus, and analysis software ver4.5.0.5 that are manufactured by Oji Scientific Instruments were used for retardation measurement. The measurement principle was based on a parallel-nicols rotation method. The apparatus was set up such that the transmission axes of a polarizer and an analyzer (similar to the polarizer) were parallel with each other. The apparatus was rotated at a rotation pitch of 30° in a range of 0° to 150°, and a phase difference and an orientation angle were calculated based on the amount of transmitted light at each angle. The standard mode with a single visual field was employed as the measurement condition. The calculation was performed under the conditions of two pixels and the second degree (the degree of double refraction was determined using an ordinary method, and second-degree data was employed). Each of the manufactured tubes was cut open and then sandwiched between glass plates. The retardations in the tubes were measured while holding the tubes down.

Figure 9:
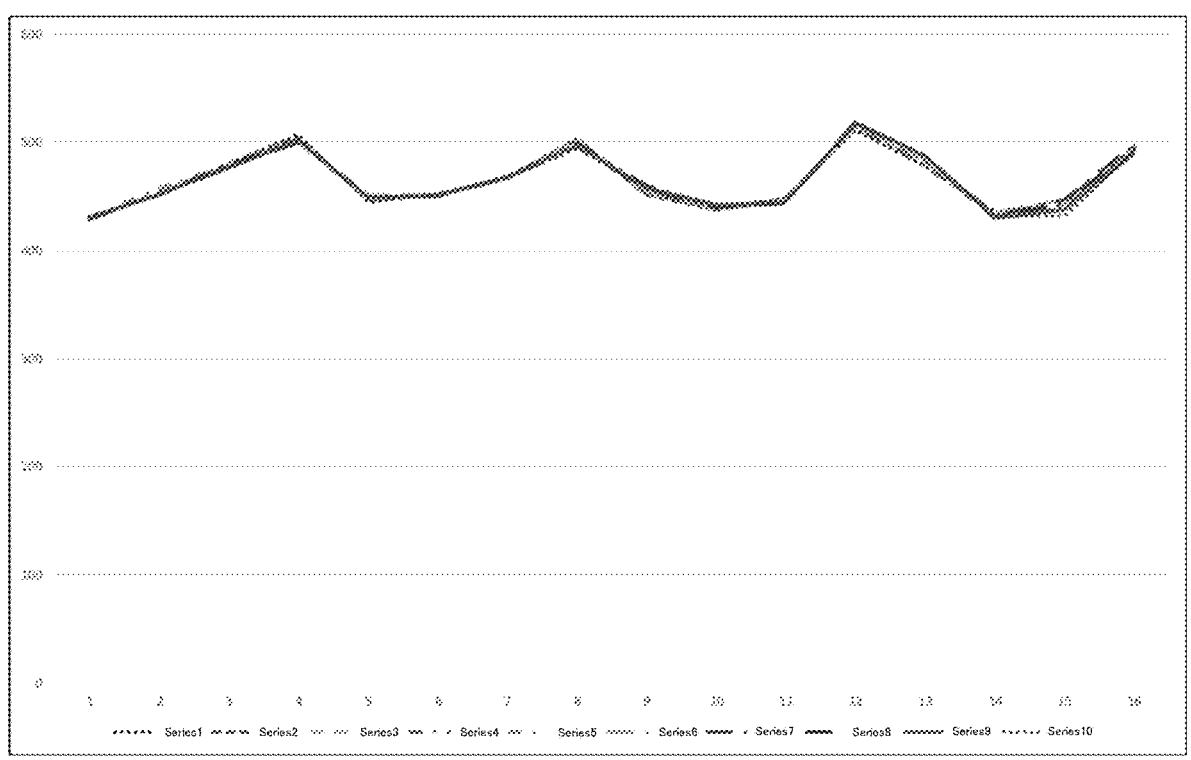
FIG. 9 is a diagram showing a portion of a retardation distribution of a fluororesin tube of Working Example 1.

FIG. 9 is a diagram showing a portion of a retardation distribution of the fluororesin tube of Working Example 1. The horizontal axis indicates the transverse direction (TD) of the cut-open fluororesin tube, and the vertical axis indicates the retardation. The series were shifted from each other by 0.071 mm in the MD. As shown in FIG. 9, peaks and valleys of the retardations alternate in the TD, and the retardations hardly vary in the MD.

Regarding the fluororesin tube of Working Example 2, the inner diameter was 2.1 mm, Rea/Rec and Reb/Red were 0.970 to 1.064, Rea/Reb was 0.832, and 10-point standard deviation/10-point average was 0.354 to 0.947. Furthermore, regarding the outer-surface roughness, Rz was 0.67, and Ra was 0.17.

Figure 10:
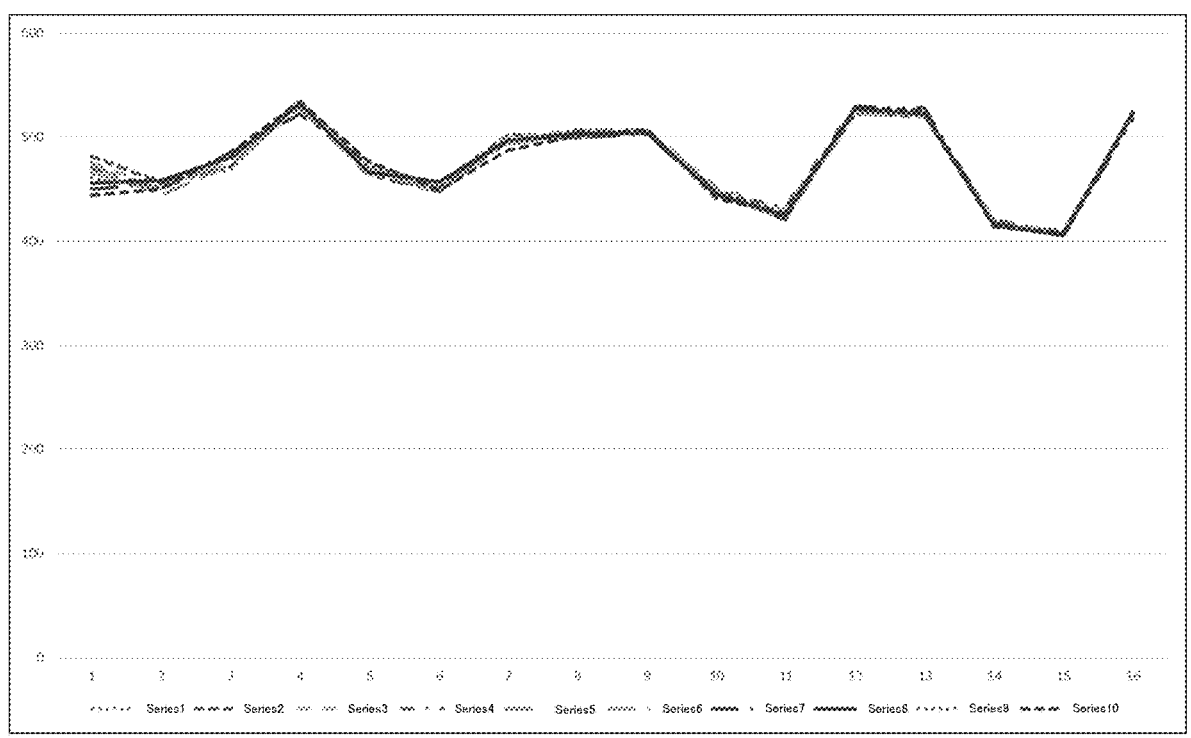
FIG. 10 is a diagram showing a portion of a retardation distribution of a fluororesin tube of Working Example 2.

FIG. 10 is a diagram showing a portion of a retardation distribution of the fluororesin tube of Working Example 2. The horizontal axis indicates the TD of the cut-open fluororesin tube, and the vertical axis indicates the retardation. The series were shifted from each other by 0.071 mm in the MD. As shown in FIG. 10, peaks and valleys of the retardations alternate in the TD, and the retardations hardly vary in the MD.

Regarding the fluororesin tube of Working Example 3, the inner diameter was 1.2 mm, Rea/Rec and Reb/Red were 0.96 to 1.09, Rea/Reb was 0.9, and 10-point standard deviation/10-point average was 0.69 to 1.13. Furthermore, regarding the outer-surface roughness, Rz was 1.26, and Ra was 0.67.

Figure 11:
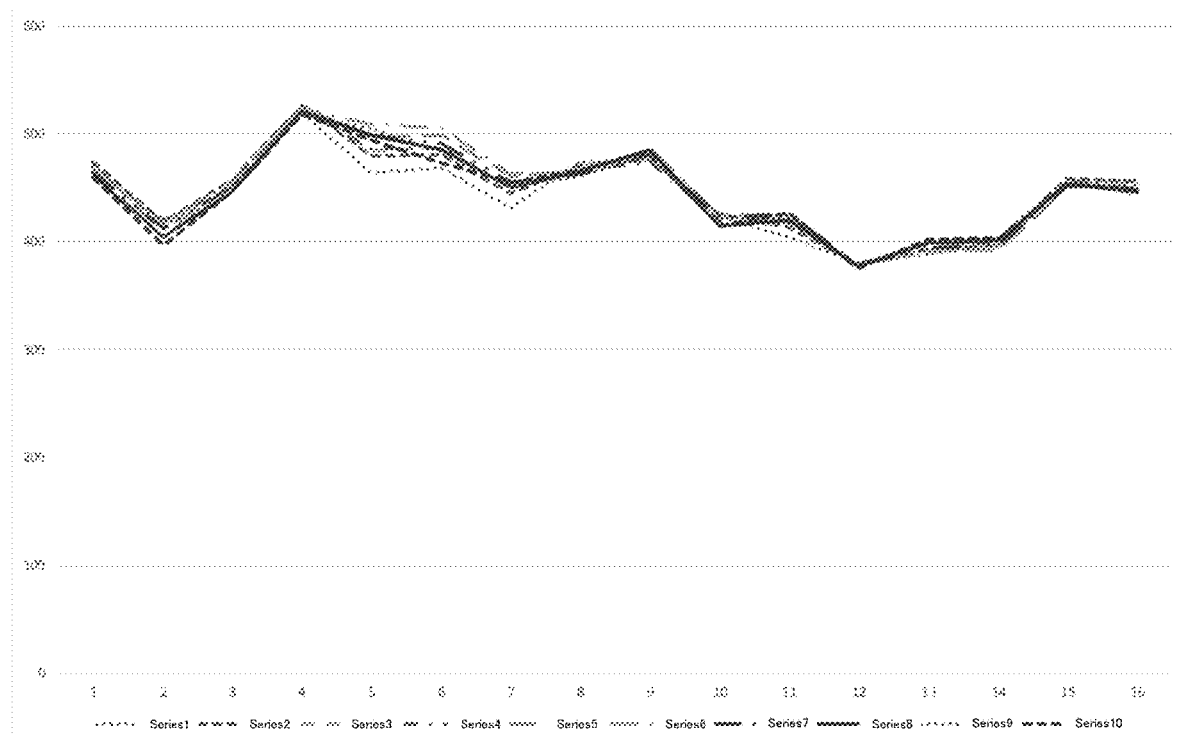
FIG. 11 is a diagram showing a portion of a retardation distribution of a fluororesin tube of Working Example 3.

FIG. 11 is a diagram showing a portion of a retardation distribution of the fluororesin tube of Working Example 3. The horizontal axis indicates the TD of the cut-open fluororesin tube, and the vertical axis indicates the retardation. The series were shifted from each other by 0.071 mm in the MD. As shown in FIG. 11, peaks and valleys of the retardations alternate in the TD, and the retardations hardly vary in the MD.

A tetrafluoroethylene-hexafluoropropylene copolymer (FEP; FEP-130J manufactured by Mitsui DuPont Fluorochemicals Co., Ltd.) was also used as the fluororesin in the comparative example in the same manner as in the working examples. In the comparative example, the fluororesin tube was manufactured without attaching the spider 24 to the cylinder 22, which was described in the above embodiment, and without providing feedback about the retardations.

Regarding the fluororesin tube of the comparative example, the inner diameter was 2.5 mm, Rea/Rec and Reb/Red were 0.473 to 1.595, Rea/Reb was 0.982, and 10-point standard deviation/10-point average was 3.929 to 8.463.

Figure 12:
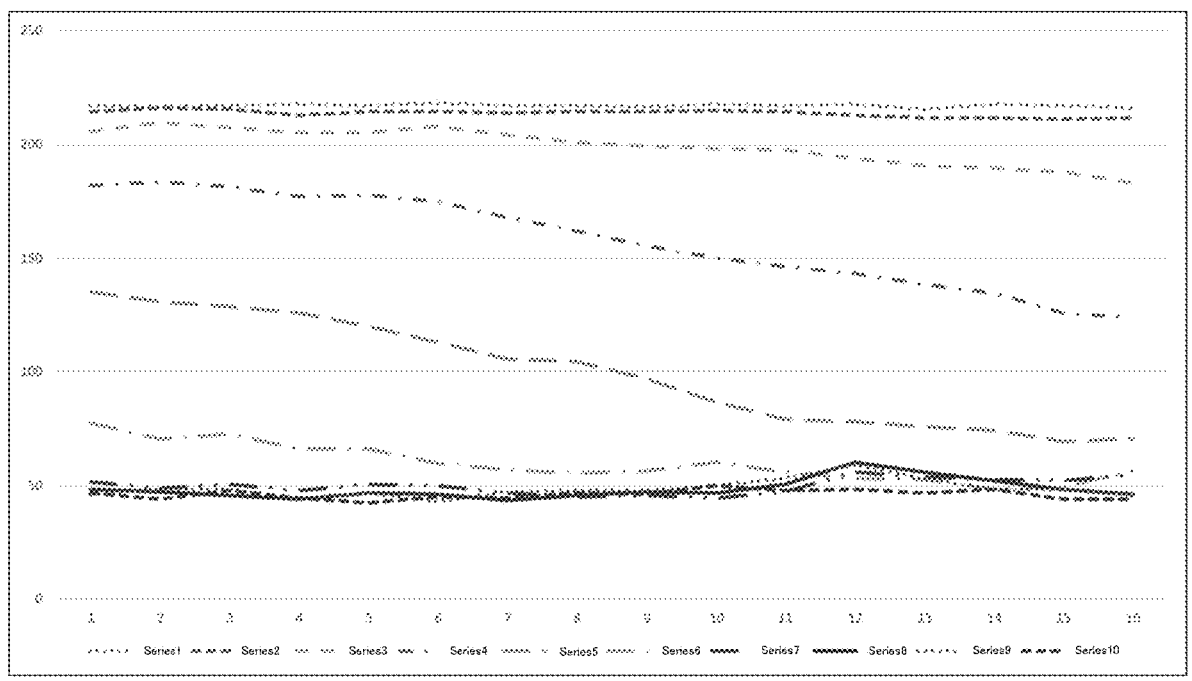
FIG. 12 is a diagram showing a portion of a retardation distribution of a fluororesin tube of a comparative example.

FIG. 12 is a diagram showing a portion of a retardation distribution of the fluororesin tube of the comparative example. The horizontal axis indicates the TD of the cut-open fluororesin tube, and the vertical axis indicates the retardation. The series were shifted from each other by 0.071 mm in the MD. As shown in FIG. 12, in most series, the retardation does not vary in the TD. In addition, the retardations greatly differ in the MD. Table 1 below provides a summary of the above measurement results.

TABLE 1

|  | Inner diameter (mm) | Rea/Rec, Reb/Red | Rea/Reb | 10-point standard deviation/10-point average | Outer-surface roughness Rz | Outer-surface roughness Ra |
| --- | --- | --- | --- | --- | --- | --- |
| Work. Ex. 1 | 3.5 | 0.968 to 1.070 | 0.887 | 0.353 to 0.701 | 0.7 | 0.27 |
| Work. Ex. 2 | 2.1 | 0.970 to 1.064 | 0.832 | 0.354 to 0.947 | 0.67 | 0.17 |
| Work. Ex. 3 | 1.2 | 0.96 to 1.09 | 0.9 | 0.69 to 1.13 | 1.26 | 0.67 |
| Comp. Ex. | 2.5 | 0.473 to 1.595 | 0.982 | 3.929 to 8.463 | — | — |

A tearability test was performed on Working Examples 1, 2, and 3 and the comparative example. The tearability test was performed as follows. A 40-mm slit was formed at an end portion of the fluororesin tube (100 mm long), and a tensile testing machine was used to tear the fluororesin tube at a speed of 200 mm/min. Cases where the tube was torn with a force of 8.0 N/mm or less were evaluated as "Good", cases where the tube was not torn and was broken partway were evaluated as "Poor", and cases where the tube was torn but the tear strength was 8.0 N/mm or more were evaluated as "Fair". Table 2 below provides a summary of the results of the tearability test.

TABLE 2

| | Tearability |
|---|---|
| Work. Ex. 1 | Good |
| Work. Ex. 2 | Good |
| Work. Ex. 3 | Good |
| Comp. Ex. | Poor |

As shown in Table 2, in the tearability test, the fluororesin tubes of Working Examples 1, 2, and 3 were torn. On the other hand, the fluororesin tube of the comparative example was not torn. It was found from the above results that Working Examples 1, 2, and 3 were excellent in tearability compared with the comparative example.

LIST OF REFERENCE NUMERALS

10 Tube
12 Space
20 Manufacturing apparatus
22 Cylinder
24 Spider
25 Inner base
26 Outer base
27 Leg portion
28 Channel
A1, B1, C1, D1 Set
a, b, c, d Point
LG1 Length
LN1 Line
P1, P2 Position
T1 Region

What is claimed is:

1. A tube made of a fluororesin,
the tube having axial tearability and heat-shrinkable properties,
the tube including points a, b, c, and d that satisfy both conditions (1) and (2) below:

$$0.9 < Rea/Rec < 1.1 \text{ and } 0.9 < Reb/Red < 1.1; \text{ and} \quad (1)$$

$$Rea/Reb \leq 0.9 \text{ or } Rea/Reb \geq 1.1, \quad (2)$$

the points a, b, c, and d being four random points that are located on a circumference of the tube on any cross section in an axial direction of the tube, and being aligned in the stated order in a circumferential direction,
the Rea, Reb, Rec, and Red respectively indicating retardations at the points a, b, c, and d,
the tube further satisfying a condition (3) below:

$$(10\text{-point standard deviation}/10\text{-point average}) \times 100 \leq 2 \text{ in respective sets } A, B, C, \text{ and } D, \text{ and} \quad (3)$$

each of the sets A, B, C, and D including retardations at ten random points present in a range between the point a, b, c, or d and a point 5 mm away from that point in the axial direction.

2. The tube according to claim 1, wherein a surface roughness Rz of an outer surface of the tube is 2.0 μm or less.

3. The tube according to claim 1, wherein a surface roughness Ra of an outer surface of the tube is 1.0 μm or less.

4. The tube according to claim 1, wherein a distance between the points a and b is shorter than a quarter of a circumferential length of the tube.

5. The tube according to claim 1, wherein a distance between the points a and b is 0.4 mm or shorter.

6. The tube according to claim 1, wherein the fluororesin can be molded through heat-melting extrusion molding.

7. The tube according to claim 1, wherein the fluororesin is a multi-component copolymer comprising constituted by three or more types of monomers.

* * * * *